3,312,670
CRYSTALLIZABLE VINYLSULFONIC ESTER POLYMERS

Harry W. Coover, Jr., and Donald J. Shields, Kingsport, Tenn., assignors to Eastman Kodak Company, Rochester, N.Y., a corporation of New Jersey
No Drawing. Filed Mar. 25, 1964, Ser. No. 354,776
7 Claims. (Cl. 260—79.3)

This invention relates to the preparation of crystallizable vinyl sulfonic ester polymers and is a continuation-in-part of U.S. application Ser. No. 758,902, filed Sept. 4, 1958, now abandoned.

It is known that the aryl and alkyl esters of vinyl sulfonic acid are difficult to polymerize to high molecular weight polymers under ordinary conditions such as with free radical catalysts or by exposure to actinic light such as ultraviolet light. The polymers, when obtained, tend to be soft and rubbery and are not, in general, useful commercial materials. For example, ethylvinyl sulfonate (ethyl ethylenesulphonate) after a two week exposure to ultraviolet light gave only a soft, rubbery, yellow polymer. (See Alderman patent, U.S. 2,348,705, Example VI.) Polymers prepared in this manner are amorphous in nature, giving at best only the single, diffuse ring, X-ray diffraction pattern characteristic of all amorphous polymers, and not the sharp, multi-ring, X-ray diffraction pattern of crystalline materials. It is noted that copolymers prepared from these esters and comonomers such as methyl methacrylate (see Alderman, U.S. 2,348,705, Example XI) are amorphous and do not give a multi-ring, X-ray diffraction pattern.

We have now made the discovery that crystalline, high-molecular weight polyvinyl sulfonates can be formed by using special polymerization catalysts and that these polymers can be readily converted to shaped articles, e.g., into sheets or fibers that are characterized by being strong, oriented, crystalline and having high softening points.

It is, accordingly, an object of the invention to provide novel high-molecular weight, crystalline polyvinyl sulfonates. Another object is to provide useful fibers thereof. Another object is to provide a process for preparing the crystalline polyvinyl sulfonates. Other objects will become apparent hereinafter.

In accordance with the invention, we prepare high-molecular weight crystalline polysulfonates by contacting a monomeric vinyl sulfonate represented by the following general formula:

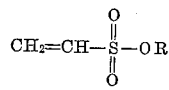

wherein R represents an alkyl group of from 1–4 carbon atoms or a phenyl, tolyl or xylyl group, with a catalyst comprising a metal alkyl or a mixture of a metal alkyl and a transition element derivative, at from −70–200° C., but preferably from −70°–120° C., until the monomer has polymerized to give the crystalline polymer thereof. Ordinarily a hydrocarbon reaction medium is employed, e.g. pentane, hexane, heptane or higher alkanes, toluene, and the like, although in some cases superior results are obtained by using coordinating solvents such as dioxane, tetrahydrofuran, dimethoxyethane and the like either alone or in admixture with one of the preceding hydrocarbon solvents. The polymeric products are separated from the reaction mixture by conventional separation methods, e.g. by evaporation of the solvent medium, by precipitation of the reaction mixture into a nonsolvent, washing, drying, etc.

Suitable catalysts comprise metal alkyls of the general formula $R'_nM$ wherein $n$ represents an integer of 1–3, R' represents a hydrogen atom, an alkyl group of 1–6 carbon atoms or an aryl group such as phenyl, tolyl, naphthyl, etc. and M represents an element of Groups I, II and III of the periodic table of elements e.g. alkali metal hydrides, alkali metal alkyls and metal alkyls of polyvalent metals such as amylsodium, butyllithium, naphthalenesodium, triethylaluminum, etc. alone or in combination with one or more compounds of the metals represented by Groups 4B, 5B, 6B and 8 of periodic table of elements, as well as maganese compounds in Group 7. When a catalyst combination is used, an alkali-metal alkyl in combination with a halide of a heavy metal represented by titanium, zirconium, chromium, vanadium and molybdenum is preferably employed. Another highly suitable catalyst combination is triethylaluminum and titanium tetrachloride. The proportions of the catalyst compounds can be varied over a wide range, for example, from 0.05–10.0% or more of each component, based on the total weight of monomer employed, but preferably from 0.1–5.0% of the metal alkyl and from 0.1–0.5% of the said metal halide in ratio of 1–4 parts by weight metal alkyl to one part by weight metal halide. Suitable vinyl sulfonates that can be polymerized to give the crystalline or crystallizable polymers of the invention include methyl vinylsulfonate, ethyl vinylsulfonate, propyl vinylsulfonate, isopropyl vinylsulfonate, n-butyl vinylsulfonate, phenyl vinylsulfonate, o-tolyl vinylsulfonate, etc.

The following examples will serve to illustrate further the new crystalline polymers of the invention and the manner of their preparation. The X-ray diffraction pattern of each of the polymers in these examples has at least two clearly defined, non-diffuse rings which results from at least substantial crystallinity, that is, at least about 10% crystallinity. It is particularly noted that at best, amorphous material shows only a single, diffuse ring in its X-ray diffraction pattern.

EXAMPLE 1

Into a 150 ml. pressure bottle purged with nitrogen were placed 80 ml. of dry heptane, 20 g. of ethylvinyl sulfonate, 0.8 g. of triethylaluminum, and 0.2 g. of titanium tetrachloride. The mixture was tumbled at 60° for 15 hours. The isolated polymer, which had an inherent viscosity of about 0.5, was, according to X-ray diffraction patterns, highly crystalline. It could be molded to give a hard, rigid, water-resistant plastic and could also be spun, drafted, and stabilized to give strong, oriented, crystalline, high-softening fibers.

EXAMPLE 2

Into a 150-ml. pressure bottle purged with nitrogen were placed 80 ml. of dry heptane, 20 g. of isobutylvinyl sulfonate, 0.8 g. of lithium butyl, and 0.2 g. of titanium trichloride. The mixture was tumbled at 60° for 15 hours. The isolated polymer, which had an inherent viscosity of about 0.5, was, according to X-ray diffraction patterns, highly crystalline. It could be molded to give a hard, rigid, water-resistant plastic and could also be spun, drafted, and stabilized to give strong, oriented, crystalline, high-softening fibers.

EXAMPLE 3

Into a 150 ml. pressure bottle purged with nitrogen were placed 80 ml. of dry heptane, 20 g. of phenylvinyl sulfonate, 0.8 g. of sodium naphthalene, and 0.2 g. of zirconium tetrachloride. The mixture was tumbled at 60° for 15 hours. The isolated polymer, which had an inherent viscosity of about 0.5, was, according to X-ray diffraction patterns, highly crystalline. It could be molded to give a hard, rigid, water-resistant plastic and could also be spun, drafted, and stabilized to give strong, oriented, crystalline, high-softening fibers.

EXAMPLE 4

The procedure of Example 1 was followed using 2.5 of a 16.3% triethylaluminum solution in heptane and 0.62 g. of titanium trichloride. A similar polymer having an inherent viscosity of about 0.6 was obtained. According to X-ray diffraction patterns, it was highly crystalline. It could be molded to give a hard, water-resistant plastic.

EXAMPLE 5

Into a 100 ml., 3-necked flask equipped with dropping funnel, thermometer, and stirrer and cooled in a Dry Ice bath was placed 40 g. of dry dimethoxyethane and 20 g. of ethyl vinyl sulfonate. 6 ml. of a 10% solution of n-butyllithium in hexane was added dropwise with stirring. An exothermic reaction resulted and the polymer partially separated from the solution. The isolated polymer had an inherent viscosity of about 0.7 and according to X-ray diffraction patterns was highly crystalline. It could be spun to give strong, crystalline, high-softening fibers.

EXAMPLE 6

Into a 100-ml., 3-necked flask equipped with dropping funnel, thermometer, and stirrer, and cooled in Dry Ice was placed 40 g. of dry toluene and 20 g. of ethyl vinyl sulfonate. 6 ml. of a 10% solution of n-butyllithium in hexane was added dropwise with stirring. An exothermic reaction resulted and the reaction mixture became thick. The isolated polymer, which had an inherent viscosity of about 0.4, was, according to X-ray diffraction patterns, highly crystalline. It could be molded to give a hard, rigid, water-resistant plastic.

EXAMPLE 7

To a 100-ml., 3-necked flask equipped with dropping funnel, thermometer, and stirrer, and cooled in a Dry Ice bath to −60° C. were added 40 g. of dry heptane and 100 g. of ethyl vinyl sulfonate. 6 ml. of a 10.5% solution of n-butyllithium in heptane was added dropwise with stirring. A solid white polymer formed in the flask. It proved to have an inherent viscosity of about 0.8 and according to X-ray diffraction patterns was highly crystalline. It could be molded to give a hard, rigid, water-resistant plastic.

EXAMPLE 8

Into a 100-ml. pressure vessel purged with nitrogen were placed 30 ml. of dry heptane, 6 ml. of 1,2-dimethoxyethane, 20 g. of ethyl vinyl sulfonate, 4 g. of a 16.3% triethylaluminum solution in dry heptane, and 0.34 g. of vanadium trichloride. An exothermic reaction occurred and the solution became thick. The isolated polymer, which had an inherent viscosity of about 1.0, was, according to X-ray diffraction patterns, highly crystalline. It could be spun into strong, crystalline, high-softening fibers.

If desired, one or more different monomers can be copolymerized with the alkyl vinyl sulfonate. The second monomer can be different alkyl vinyl sulfonate or it can be any one of several monoethylenically unsaturated monomers. For example, ethyl vinyl sulfonate can be copolymerized with styrene to give a highly crystalline product, or it can be copolymerized with methyl methacrylate to give a copolymer of slightly reduced crystallinity. This behavior is illustrated in, but should not be limited by, the following example.

EXAMPLE 9

The procedure of Example 1 was followed using 8 g. of ethyl vinyl sulfonate, 2 g. of styrene, 0.8 g. of triethylaluminum, and 0.2 g. of titanium tetrachloride. The mixture was tumbled at 60° for 15 hours. The isolated polymer, which had an inherent viscosity of about 0.7 was, according to X-ray diffraction patterns, highly crystalline. It could be molded to give a hard, rigid, water-resistant plastic.

Generally similar crystalline polymers are obtainable by substituting in the above examples any other of the mentioned alkyl and aryl vinylsulfonates. Also, crystalline copolymers of the alkyl and aryl vinylsulfonates may be prepared with various comonomers such as styrene, alkyl methacrylates wherein the alkyl group contains from 1–4 carbon atoms e.g. methyl methacrylate, n-butyl methacrylate, etc., the said comonomer being present up to about 30% by weight, based on the total weight of monomers in the polymerization mixture. The resultant copolymer contains about the same proportion of components in linear combination as the proportions of monomer and comonomer in the staring polymerization mixtures. All of the polymers of the invention can be fashioned into shaped articles by molding, melt-spinning, coating from solution, etc. Fillers, dyes, pigments, and the like can be incorporated into the compositions. The sheet materials prepared from the polymers are strong and tough and particularly useful for wrapping materials and for photographic film supports. All of the polymers are soluble in one or more volatile solvents including dimethyl, formamide, dimethyl acetamide, acetonitrile, and the like.

The unusual and improved properties such as increased hardness, improved heat resistance, and draftability of the polymers formed by the process of this invention are probably related to the crystallinity of the polymers. The preparation of crystalline or crystallizable polymers is well known in the case of hydrocarbon-type monomers such as ethylene, propylene, styrene, and the like. However, the literature is replete with references stating that monomers containing functional groups such as sulfonic ester, poison the usual catalysts that lead to crystallizable polymers. In the process of our invention, however, crystalline polyvinyl sulfonates can be formed with surprising ease and in good yields under relatively mild reaction conditions.

The invention has been described in detail with particular reference to preferred embodiments thereof, but it will be understood that variations and modifications can be effected within the spirit and scope of the invention described hereinabove and as defined in the appended claims.

We claim:

1. A process for preparing a crystalline polymer having an inherent viscosity of from 0.4–1.0 which comprises polymerizing at from −70° to 200° C. monomeric material selected from the group consisting of (1) a vinylsulfonate monomer having the general formula:

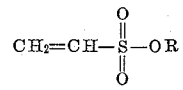

wherein R represents a member selected from the group consisting of an alkyl group of from 1–4 carbon atoms and (2) a mixture consisting essentially of at least 70% by weight of said vinyl-sulfonate monomer and not more than 30% by weight of a monomer selected from the group consisting of styrene and an alkyl methacrylate wherein the said alkyl group contains from 1–4 carbon atoms, in the presence of from 0.05–10.0 based on the total weight of said monomeric material of a catalyst selected from the group consisting of (a) a metal alkyl selected from the group consisting of a trialkyl aluminum and an alkyl lithium wherein said alkyl in each instance contains from 1–6 carbon atoms, and (b) a mixture of from 1–4 parts by weight of said metal alkyl with one part by weight of a halide of a heavy metal selected from the group consisting of titanium, zirconium, chromium and vanadium.

2. The process of claim 1 wherein the said monomeric material is solely ethylvinylsulfonate and the said catalyst is a mixture of triethylaluminum and titanium tetrachloride.

3. The process of claim 1 wherein the said monomeric material is solely isobutylvinylsulfonate and the said catalyst is a mixture of n-butyl lithium and titanium trichloride.

4. The process of claim 1 wherein the said monomeric material is solely phenylvinylsulfonate and the said catalyst is a mixture of sodium naphthalene and zirconium tetrachloride.

5. The process of claim 1 wherein the said monomeric material is solely ethylvinylsulfonate and the said catalyst is solely n-butyl lithium.

6. The process of claim 1 wherein the said monomeric material is a mixture of 80% by weight of ethylvinylsulfonate and 20% by weight of styrene and the said catalyst is a mixture of triethylaluminum and titanium tetrachloride.

7. A product prepared by the process of claim 1.

References Cited by the Examiner

UNITED STATES PATENTS

| | | | |
|---|---|---|---|
| 2,348,705 | 5/1944 | Alderman et al. | 260—456 |
| 2,531,469 | 11/1950 | Reynolds et al. | 260—79.3 |
| 2,675,372 | 4/1954 | Coover et al. | 260—79.3 |
| 2,841,574 | 7/1958 | Foster | 260—79.3 |
| 2,852,497 | 9/1958 | Thompson | 260—79.3 |
| 2,932,633 | 4/1960 | Juveland | 260—82.1 |

OTHER REFERENCES

Journal of Polymer Science, vol. 16, April 1955, pp. 143–154.

Journal of Polymer Science, vol. 31, August 1958, pp. 173–177.

Schildknecht et al., Industrial and Engineering Chem., vol. 41, September 1949, pp. 1998–2003.

Hill, Fibers From Synthetic Polymers, Elsevier Pub. Co., Amsterdam, Netherlands, 1953, p. 232.

Flory, Principles of Polymer Chemistry, Cornell Univ. Press, Ithaca, N.Y., 1953, pp. 237–8.

Tobolsky, Properties and Structure of Polymers, John Wiley and Sons, 1960, pp. 198–9.

JOSEPH L. SCHOFER, *Primary Examiner.*

D. K. DENENBERG, *Assistant Examiner.*